No. 619,858. Patented Feb. 21, 1899.
G. F. BIGGS.
HAY PRESS.
(Application filed June 18, 1898.)

(No Model.) 2 Sheets—Sheet 1.

Witnesses
Franck L. Ourand.
F. S. Duffie.

Inventor
George F. Biggs
By John S. Duffie
Attorney

No. 619,858. Patented Feb. 21, 1899.
G. F. BIGGS.
HAY PRESS.
(Application filed June 18, 1898.)
(No Model.) 2 Sheets—Sheet 2.
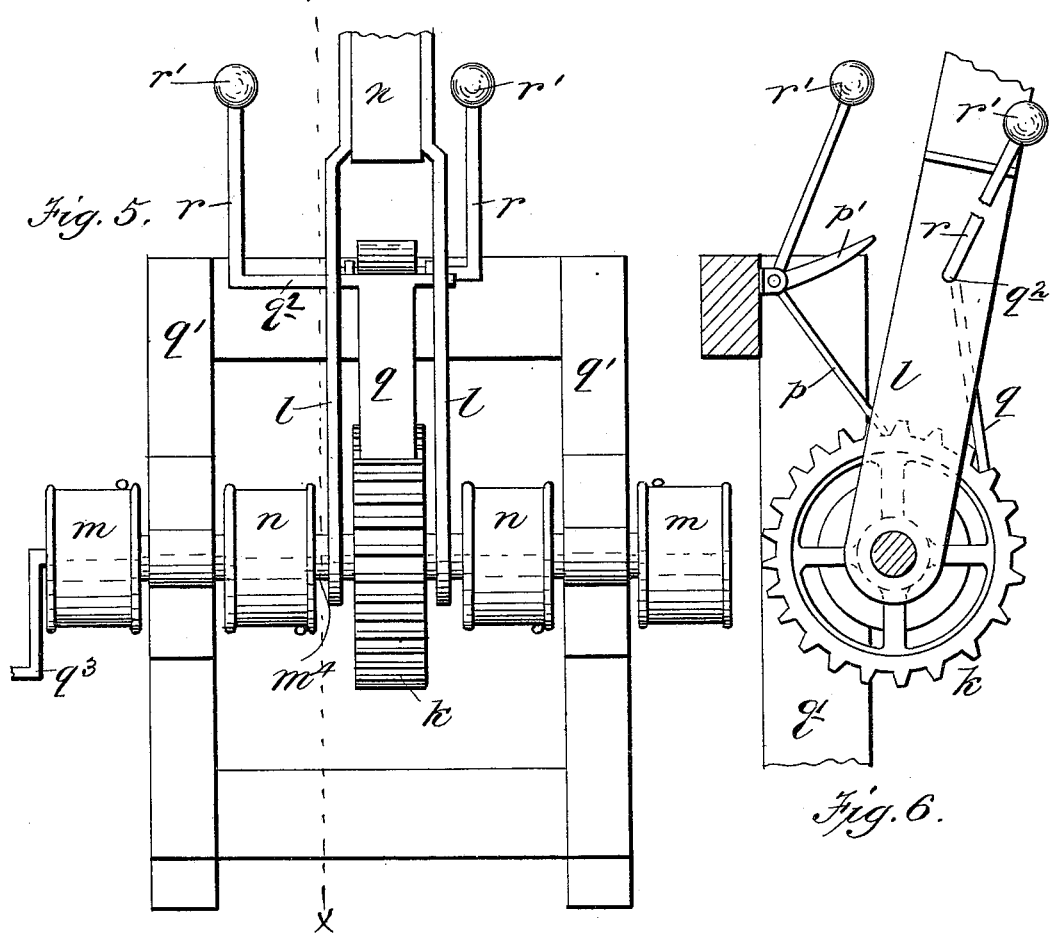
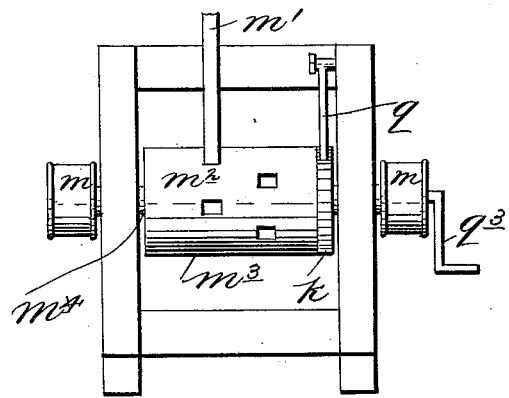
Witnesses
Franck L. Ourand.
F. S. Duffie
Inventor
George F. Biggs
By John S. Duffie
His Attorney

UNITED STATES PATENT OFFICE.

GEORGE FRED BIGGS, OF SEARCY, ARKANSAS.

HAY-PRESS.

SPECIFICATION forming part of Letters Patent No. 619,858, dated February 21, 1899.

Application filed June 18, 1898. Serial No. 683,814. (No model.)

*To all whom it may concern:*

Be it known that I, GEORGE FRED BIGGS, a citizen of the United States, residing at Searcy, in the county of White and State of Arkansas, have invented certain new and useful Improvements in Hand Hay-Presses; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a cheap hand-power hay-press; and the objects of my improvements are, first, to provide a hand-power press; second, to provide in the construction thereof for the transportation of the press by any regulation-size two-horse wagon, and, third, to provide a cheap hand-power hay-press so cheap that any farmer may own it. I attain these objects by the construction illustrated in the accompanying drawings, in which—

Figure 1:
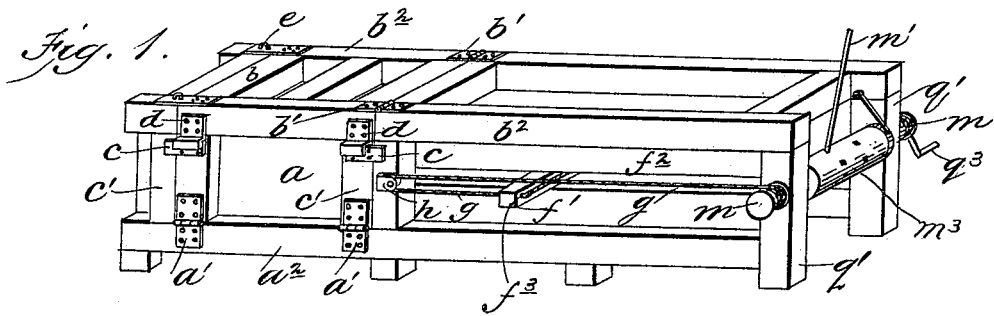
Figure 2:
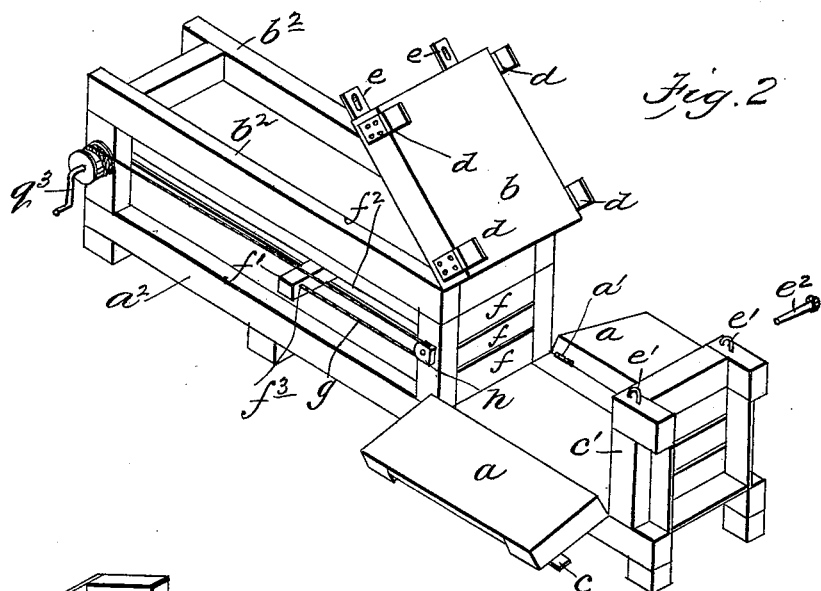
Figure 3:
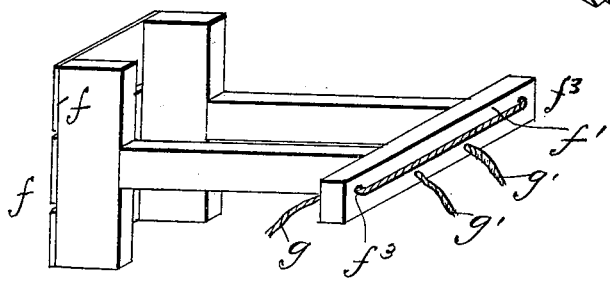
Figure 4:
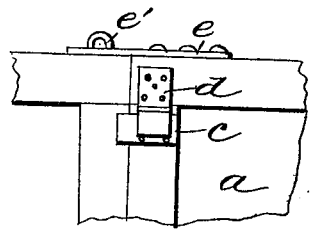

Figure 1 is a perspective view of the press closed. Fig. 2 is a view of the press reversed, with gates opened, after the bale of hay has been removed. Fig. 3 is a perspective view of the follow-block removed from the press. Fig. 4 is a detail view showing how the gates and top of bale-box are fastened. Fig. 5 is a front end view showing a cog-wheel, a lever, a pawl, and balancing-balls when these are used instead of the simple drum $m^3$. Fig. 6 is a sectional view of Fig. 5 on the line X X. Fig. 7 is a front end view of Fig. 1.

My invention is made for a regulation-size bale and as follows:

The frame is constructed of hard timbers, mortised and bolted together. The inside lining is made of some light material.

Fig. 1 shows the press closed ready for work. Fig. 2 shows the gate open after the bale has been removed.

The side gates $a$ are strongly hinged by hinges $a'$ to the lower beam $a^2$ of the frame and have iron cleats $c$ to keep the gates flush with the outer face of the posts $C'$.

The top gate $b$ is hinged by hinges $b'$ to the top of the sills $b^2$ of the frame and has side cleats $d$ to lap over cleats $c$, as shown in Figs. 1 and 4, to hold the side gates $a$ in place when pressure comes from the inside. Slotted strap-plates $e$ are secured to the free end of the top gate $b$ to fit over staples $e'$ and are secured in place by pin-locks $e^2$ or their equivalents.

The construction of the press-head or follow-block is shown in Fig. 3. Grooves $f$ are left in the front face of the follow-block, and corresponding grooves are left in the front part of the press to pass the baling-wire through and around the bale. The cross-beam $f'$ of the press-head (see Fig. 3) protrudes six inches on either side of the frame through slots $f^2$, running the full length of the hay-box, Figs. 1 and 2. The ends of the cross-beam $f'$ have perforations $f^3$ to take the rope $g$. Said ropes $g$ are then run through pulleys $h$ and fastened to the drums $m$.

The press-power is furnished by a lever $m'$, which works in sockets $m^2$ in drum $m^3$, rigidly secured to a shaft $m^4$, to which shaft the drums $m$ are also rigidly secured; or the press-power may be furnished by a cog-wheel $k$ in the front end of the press and a lever $l\,l\,n$, centered on the shaft $m^4$. A pawl $q$ is pivoted between the arms $l\,l$ of the lever and serves to turn the wheel $k$, which is also rigidly secured on the shaft $m^4$, journaled in the posts $q'$. A pawl $p$, pivoted between the posts $q'$, is balanced by a spur $p'$ and ball $r'$ to keep the cog-wheel $k$ from turning backward when released from the pressure of the pawl $q$.

Ropes $g'$ are fastened one to each end of the press-head beam $f'$, so as to work inside of the press, and fastened to the drums $n$, Fig. 5. Rope $g$ is secured to the cross-piece $f'$ by being passed through perforations $f^3$, thence over pulleys $h$, and are then secured to drums $m$. By turning the drums $m$ by means of lever $l\,l\,n$ the rope will pull the press-head forward till the bale is pressed. When the bale has been wired, the lever $l\,l\,n$ is thrown back until the shaft $q^2$ of the pawl $q$ comes against the spur $p'$ of pawl $p$. This releases the pawl $p$ from the cog-wheel and also pawl $q$ from the cog-wheel, and pawls $p$ and $q$ are thus locked together clear of the cog-wheel by the contact between shaft $q^2$ and spur $p'$. The press-head is pulled back by the ropes $g'$, fastened to the drums $n$, and a crank $q^3$, fitted to the end of the shafting $m^4$. Both pawls are provided with arms $r$ and balance-balls $r'$.

When I make a less expensive press, the power mechanism shown in Fig. 7 is used.

Having described my invention, what I claim as new, and desire to secure by Letters Patent, is—

1. A hand-power press, consisting of a frame, having in each side a horizontal slot $f^2$; a power mechanism in its front end; a follower-block operated by said power mechanism; a baling-box in its rear end, consisting of a bottom secured to the bottom sills; end wall secured to the end posts; side doors $a$; cleats $c$, on said side doors; top door $b$; cleats $d$, secured to said top door and overlapping cleats $c$; posts $c'$; staples $e'$, in the upper ends of said posts; slotted staples $e$, secured to the free end of door $b$, and fitting over staples $e'$, and adapted to be secured by lock-pins $e^2$, substantially as shown and described.

2. A hand-power press, consisting of a frame, having a baling-box, and in each side a horizontal slot $f^2$; a follower-block having a cross-piece $f'$, its ends extending through said slots; a shaft $m^4$, journaled on posts $q'$, of said frame; drums $m$, one rigidly secured on each end of said shaft; drums $n$, rigidly secured on said shaft between said posts; crank-arm $q^3$, rigidly secured on one end of said shaft; cog-wheel $k$, rigidly secured on said shaft between drums $n$; lever $l, l, n$, centered on said shaft, pawl $q$, pivoted between said arms $l, l$, on shaft $q^2$, and having a balancing-arm $r$, and ball $r'$; pawl $p$, pivoted between posts $q'$ and having a spur $p'$ and balancing arm and ball $r'$, said shaft $q^3$, adapted to impinge against spur $p'$, and lock said pawl $p$, back out of contact with cog-wheel $k$; rope $g$, secured to cross-piece $f'$, passing thence over pulleys $h$, its ends secured to drums $m$; ropes $g'$, secured by one end to cross-piece $f'$, their other end to pulleys $n$, substantially as shown and described and for the purposes set forth.

In testimony whereof I affix my signature in presence of two witnesses.

GEORGE FRED BIGGS.

Witnesses:
PERRY F. ROBERTSON,
JAMES E. LIGHTLE.